United States Patent [19]

Crisler et al.

[11] Patent Number: 5,598,417
[45] Date of Patent: Jan. 28, 1997

[54] DYNAMIC CONTROL OF A DATA CHANNEL IN A TDM WIRELESS COMMUNICATION SYSTEM

[75] Inventors: Kenneth J. Crisler, Lake Zurich; Michael L. Needham, Palatine, both of Ill.

[73] Assignee: Motorola, Inc., Schaumburg, Ill.

[21] Appl. No.: 644,929

[22] Filed: May 13, 1996

Related U.S. Application Data

[63] Continuation of Ser. No. 431,173, Apr. 28, 1995, abandoned.

[51] Int. Cl.$^6$ ............................................. H04J 3/16
[52] U.S. Cl. ............................................. 370/348
[58] Field of Search ............................ 370/95.1, 95.2, 370/95.3, 79, 80, 110.1, 110.4

[56] References Cited

U.S. PATENT DOCUMENTS

| | | | |
|---|---|---|---|
| 4,414,661 | 11/1983 | Karlstrom | 370/95 |
| 4,831,373 | 5/1989 | Hess | 340/825.03 |
| 4,870,408 | 9/1989 | Zdunek et al. | 340/825.03 |
| 5,420,574 | 5/1995 | Erickson et al. | 340/825.03 |

OTHER PUBLICATIONS

Hermann J. Helgert, "Integrated Services Digital Networks," 1991, p. 307, Addison–Wesley.

Primary Examiner—Benedict V. Safourek
Assistant Examiner—Matthew C. Phillips
Attorney, Agent, or Firm—Christopher P. Moreno

[57] ABSTRACT

A central controller (101) in the TDM wireless communication system (100) transmits a data channel update message (600), including an allocation profile (603) and an update interval (605) to a second group of communication units (107–109). The allocation profile indicates time slots used to form a data channel and the update interval indicates a period of time until transmission of the next data channel update message. The data channel update message, transmitted via the data channel, is sent in response to a request from a first group of communication units (104–106) or upon expiration of a period of time based on a previous update interval. Repetition of this process allows time slots to be dynamically allocated in response to changing system requirements, while minimizing use of the data channel for data channel update messages.

33 Claims, 3 Drawing Sheets

DYNAMIC CONTROL OF A DATA CHANNEL IN A TDM WIRELESS COMMUNICATION SYSTEM

This is a continuation of application Ser. No. 08/431,173, filed Apr. 28, 1995 and now abandoned.

FIELD OF THE INVENTION

The present invention relates to TDM wireless communication systems and, in particular, to the dynamic control and usage of a data channel therein.

BACKGROUND OF THE INVENTION

Shared communication systems, in which a communications resource is used to support more than one type of communication service, are well known in the art. One example of such a shared system would be a Time Division Multiplexed (TDM) communication system designed to support multiple services. In a TDM system, the communication resource, also referred to as a communication link, is divided into a number of time portions, or time slots, of specified length. A given communication service may then be assigned a specified portion of the available time slots, while other time slots may be assigned to other services. Some examples of services that may be supported in such a system include voice communications services, circuit-switched data communications services, and packet-switched data communications services, all of which are well known in the art.

In shared communication systems, one of the main problems encountered is that of allocating portions of the shared resource to each of the supported services such that the best performance possible for each of the services is provided. One method of resource allocation, fixed allocation, permanently allocates portions of a communication resource, often based on average traffic calculations, to each supported service. For example, in a shared TDM communications system, specified time slots are always used for voice traffic, while other specified time slots are always used for packet data traffic, and so on.

Fixed allocation, however, cannot accommodate the varying resource needs of the available services, possibly leading to significant inefficiency in resource utilization. For example, in a TDM system where exactly half of the available time slots are allocated to voice services, and the other half to packet data services, any time in which the traffic requirements of each service were not equally balanced would result in under-utilization of the communication resource. Since traffic demands on a system are rarely fixed, and in fact may vary widely over the course of time, resource utilization inefficiency may be quite large.

Dynamic resource allocation can be achieved by determining the best allocation of resources at a given moment in time, and then allocating the resources to each of the services. Such dynamic allocation of resources requires that a controlling entity communicate the current resource allocation to users of the system.

In a TDM communication system, for example, the time slots on the communication link may be further grouped into a series of frames, each of which contains a fixed number of time slots. Included in each frame is a control field, i.e., dedicated "out-of-band" control signaling. A central controller, acting as a slot allocator, indicates the slot allocation for each frame in the respective control field. For instance, in a given frame, there may be a large number of data packets to send, but only one ongoing voice communication. Thus, the control field for the given frame would indicate one time slot for voice service and the remaining time slots for packet data service. The control fields of subsequent frames would similarly designate the allocation of time slots to the different types of services.

The control fields in each frame represent additional overhead which cannot be used for communications services, thereby creating an inefficiency. In particular, if the allocation scheme does not change over the course of many frames, the control fields merely repeat redundant information. The frames could be designed to contain a larger number of TDM slots, thereby reducing the control field overhead. However, if resource requirements of one or more of the services changes on a frequent basis (e.g., voice traffic consisting of relatively short messages that come in "bursts"), there will be excessive delays, due to the larger number of time slots per frame, in re-allocating resources to the services.

An alternative to "out-of-band" signaling is "in-band" signaling, in which the control signaling is done as-needed using that portion of the communication resource normally allocated to supported communication services. This reduces the overhead inefficiencies that occur with out-of-band signaling. However, in-band signaling is difficult to implement in many circumstances. One reason is that it may interfere unacceptably with user communications, since it uses the same resource. Also, complexity may be increased if communication units need to search for signaling when there is no a priori knowledge of where the signaling will occur.

Therefore, the need exists for a method of dynamic resource allocation requiring minimal signaling overhead on the communication resources, and in which the frequency of signaling messages adapts to changing traffic conditions. Also, it is desired that the signaling messages occur at predictable times, such that they do not interfere with user communications services.

DESCRIPTION OF A PREFERRED EMBODIMENT

The present invention provides a method for controlling a data channel in a TDM wireless communication system. In a first embodiment, a central controller in the TDM wireless communication system receives a request for at least one time slot of a plurality of time slots, the time slot to be used for a voice transmission. The request is sent by a communication unit of a first group of communication units. In response to the request, the central controller transmits a data channel update message, including an allocation profile, to a second group of communication units. The data channel update message is transmitted via the data channel itself. The allocation profile indicates a portion of the plurality of time slots used to form the data channel. Once the data channel update message has been transmitted to the second group, the central controller can allocate the at least one time slot per the request. Until a second data channel update message is transmitted, communication units of the second group use the data channel as defined by the allocation profile.

In a second embodiment, the central controller determines an allocation profile and an update interval and transmits the allocation profile and update interval to the second group. The allocation profile and update interval are repeatedly determined and, after the passing of a period of time based on each update interval, are again transmitted to the second group. In this manner, the second group is continuously notified of any updates to the data channel.

In this manner, time slots are dynamically allocated in response to constantly changing system requirements, while requiring only a minimal amount of overhead. Use of the update interval allows communication units to determine when the next update of the data channel is scheduled to occur.

Figure 1:
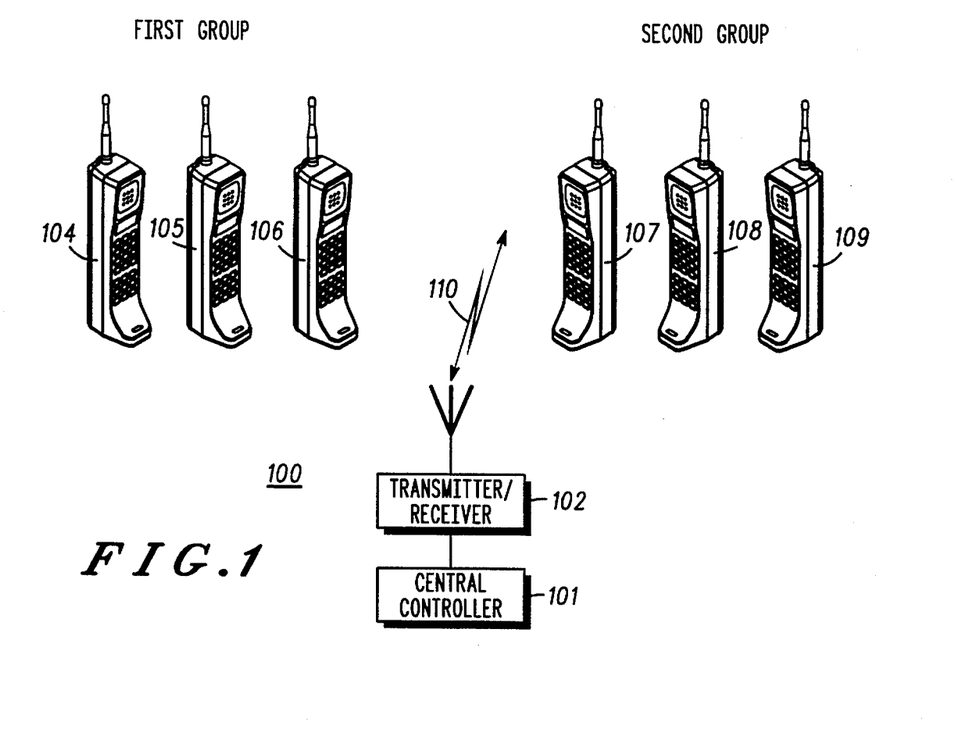
FIG. 1 is a block diagram of a TDM wireless communication system having a first and a second group of communication units.

The present invention can be more fully described with reference to FIGS. 1–9. FIG. 1 is a block diagram of a TDM wireless communication system having a first and a second group of communication units. The TDM wireless communication system 100 comprises a central controller 101, a base station 102, a communication resource 110, and communication units 104–109. The communication units are logically divided into a first group 104–106 and a second group 107–109, as discussed below. In the preferred embodiment, the communication link 110 comprises two radio frequency (RF) carriers, one used to transmit information inbound from the communication units 104–109 to the base station 102 and another used to transmit information outbound from the base station 102 to the communication units 104–109. The communication resource 110 is further divided into a series of time slots which may be further grouped into time frames using well-known TDM methods.

The central controller 101 controls the allocation of time slots on the communication resource 110 for the various communication services supported by the system 100. Hereinafter, the available communication services are assumed to be divided into two logical types. The first type comprises those communication services (e.g., voice calls, circuit data connections and system control communications) which require a fixed-size, periodic allocation of time slots, typically one time slot per time frame. The second type comprises those communication services (e.g., packet switched data communications) which require varying allocations of time slots, often as many as are currently available. Following the division of the available communication services into two types, the communication units are also logically divided into two groups: the first group 104–106 comprises communication units currently requiring communication services of the first type and the second group 107–109 comprises communication units currently requiring communication services of the second type.

Accordingly, the central controller 101 allocates time slots differently to the two types of communication services. Note that for purposes of this discussion, one or more time slots allocated to a communication service is referred to as a communication channel. To provide a communication service of the first type, e.g., a voice call, to one or more communication units in the first group 104–106, the central controller 101 allocates one or more time slots in successive time frames to form a communication channel. This channel is then maintained until the communication service is no longer needed. For a communication service of the second type, e.g., packet data, the central controller 101 allocates one or more time slots to form a data channel.

The central controller 101 may allocate time slots such that multiple communication channels are formed on the communication resource 110. That is, the central controller 101 may allocate time slots to form one or more voice channels as well as one or more data channels. Thus, the central controller 101 may allocate all of the time slots not currently allocated to voice channels to one or more data channels.

For example, it is assumed that the system 100 uses six time slots per frame. If slots 1, 2, and 5 are currently allocated to three different voice channels for use by the first group 104–106, then slots 3, 4, and 6 in aggregate can form a data channel. As described later, the central controller 101 uses an allocation profile to indicate how the available time slots are allocated at any given time. Thus, the central controller 101 may define, in a first allocation profile, that slot 3 forms a first data channel and, in a second allocation profile, that slots 4 and 6 form a second data channel. For the remainder of this discussion, it is sufficient to consider a single data channel. It is understood that the teachings of the present invention are equally applicable to implementations in which multiple data channels (i.e., channel used by communication services of the second type) are formed.

The communication units 104–109 may be mobile or portable radio devices, such as iDEN portable radios by Motorola, Inc. The communication units 104–109 provide wireless access to the communication services provided by the communication system 100. The communication units 104–109 operate either as full-duplex units (capable of simultaneous transmit and receive functions) or half-duplex units (capable of transmit and receive functions, but not simultaneously). Also, the communication units 104–109 typically include user interfaces (not shown) such as microphones, speakers, and data device connectors, as known in the art.

Based on the type of communication service currently desired by each communication unit 104–109, the communication units can be logically divided into two groups, as described above. The division of the communication units 104–109 into two groups is logical only. That is, any communication unit 104–109 may alternately or simultaneously participate in both groups depending on the particular services each user requires. For example, a specific communication unit 104–109 may place a telephone call and send or receive packet data either consecutively or simultaneously, typically by manipulating a mode control included in the user interface.

The communication units 104–109 participate in communication services by transmitting to or receiving information from the base station 102 via the communication resource 110. The base station 102 is a fixed radio transceiver, such as a iDEN base station by Motorola, Inc., that includes apparatus for RF modulation/demodulation and related control and signal processing. The base station 102 executes communication protocols and processing as required to support communication channels established by the central controller 101. Typically, the base station 102 includes interfaces (not shown) to other communication systems, such as the Public Switched Telephone Network (PSTN) or a data network, as required to provide the communication services used by the communication units 104–109.

Although the communication system 100 as shown depicts only a single base station 102 and a single communication resource 110, it is well-known in the art that such a system may include multiple base stations and communication resources. The teachings of the present invention can be applied to any number of communication resources. Likewise, although the central controller 101 is depicted separately from the base station 102, alternate embodiments are possible wherein some or all of the central controller 101 functions are implemented within the base station 102.

Figure 2:
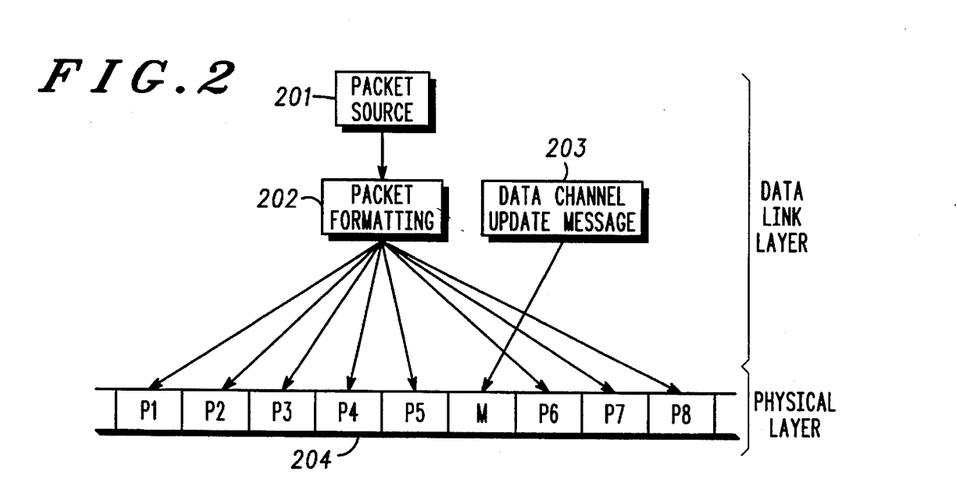
FIG. 2 illustrates a possible implementation of a data channel based on the Open System Interconnection (OSI) model.

FIG. 2 illustrates a possible implementation of a data channel based on the so-called Open System Interconnection (OSI) model, described in ISO-7498 of the International Standards Organization. As shown, the present invention is implementable via the data link layer and the physical layer. The data link layer consists of protocols and functions to communicate data across a specific communication link, such as a telephone circuit or an RF communication resource. In wireless communications systems, specific functions included in the data link layer are packet formatting, addressing and channel access protocols. The physical layer consists of electrical and/or mechanical means for communicating information. In a wireless communication system, some of the specific functions included in the physical layer are modulation, demodulation, and channel synchronization. Functions in both the data link layer and the physical layer can be implemented using known hardware and software techniques, or a combination thereof.

Referring to FIG. 2, operation of the present invention at the base station 102 and central controller 101 is shown. A packet source 201 provides data to be transmitted to one or more of the communication units in the second group 107–109. Packet formatting 202 produces, for example, data packets P1–P8. Note that both the packet source 201 and packet formatting 202 comprise protocols implemented in the data link layer as shown. The data link layer protocols typically add overhead such as packet addresses and control information.

Normally, the physical layer protocols process the data packets P1–P8 and transmit them in time slots of a data channel 204. Note that FIG. 2 illustrates the information transmitted in the time slots of the data channel 204 only; the time slots of the data channel 204 may be any subset of the time slots provided by the communication resource 110. Although the data packets P1–P8 are depicted as being transmitted one per time slot, it is possible that data packets may be long enough to span multiple time slots. In such a case, the data link layer acts to divide data packets into portions such that each portion is transmitted by the physical layer in a time slot of the data channel 204.

In addition to the packet formatting 202, a data channel update message 203 may be generated from time to time by the central controller 101. The generation of this message, for example, might be stimulated by a need to inform the second group 107–109 of a change in the allocation profile of the data channel 204. When a data channel update message is generated, the data link layer protocol acts to insert the message into the stream of data packets or data packet portions being provided to the physical layer for transmission. Note that the data link layer protocol inserts the data channel update message as opposed to substituting for a data packet or portion thereof. Thus no data packet information is lost when the data channel update message is sent.

Figure 3:
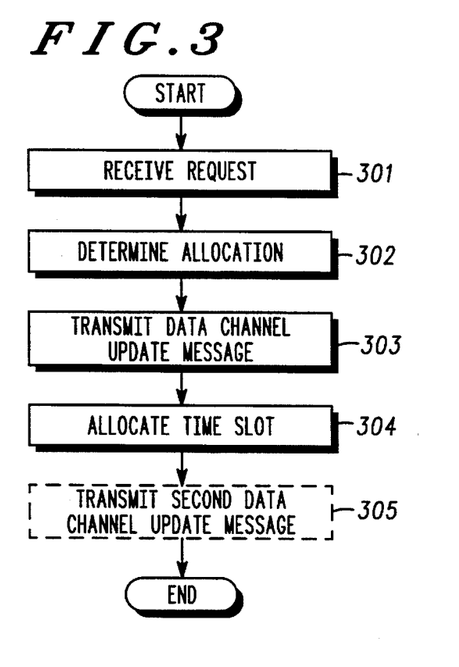
FIG. 3 is a flow chart of a first embodiment for use in a central controller.

FIG. 3 is a flow chart of a first embodiment for use in the central controller 101. The flow chart of FIG. 3 can be implemented as software stored in memory and executed by a microprocessor (not shown) within the central controller 101. At step 301, a request is received from a communication unit of the first group 104–106 desiring to participate in a communication service of the first type, such as group dispatch calls, telephone interconnect calls, and circuit-switched data connections. These services require allocation of a fixed number of time slots, typically one time slot per frame.

At step 302, the central controller 101, in response to the request and using techniques well-known in the art, determines which time slot(s) will be allocated to fulfill the request. In some circumstances, the central controller may choose to reserve one or more time slots, referred to hereinafter as pad slots, in addition to the time slots needed to fulfill the request. These pad slots may be used, for example, to provide for faster response to future requests. Assuming that the time slots chosen to fulfill the request are currently allocated to the data channel, the central controller 101 formats a data channel update message. At step 303, the data channel update message is transmitted, via the base station 102, to the communication units in the second group 107–109.

Figure 6:
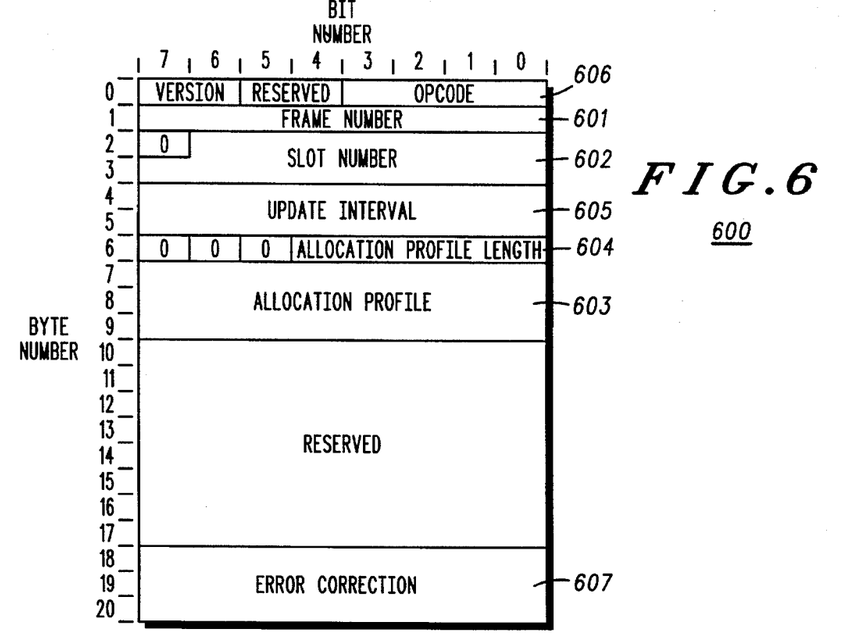
FIG. 6 illustrates a possible format for a data channel update message.

FIG. 6 illustrates a possible format for a data channel update message. The data channel update message 600 comprises a current frame number 601 and a time slot number 602 which are included to provide synchronization for the receiving communication units of the second group 107–109. An allocation profile 603 is included to indicate which of the time slots will be allocated to the data channel following transmission of the data channel update message 600. Typically, the allocation profile 603 will then include the time slots in the current allocation profile except for those slots chosen to be allocated to the new request or reserved as pad slots. The allocation profile is preferably provided in the form of a variable-length bitmap, where each bit indicates the status of a corresponding time slot. When a bit in the bitmap is set (a binary 1 value), the corresponding time slot is that is allocated to the data channel. When a bit in the bitmap is clear (a binary 0 value), the corresponding time slot is not allocated to the data channel. An allocation profile length 604, also provided in the data channel update message 600, indicates the length of the repeating pattern of allocated time slots, typically one frame. An update interval 605 expresses a period of time, as a number of overall time slots or data channel time slots only, until the next data channel update message will be transmitted. The calculation of the update interval 605 is described below. Finally, the data channel update message 600 includes such control fields 606–607 as necessary for communication units in the second group 107–109 to properly decode the data channel update message.

Following transmission of the data channel update message, the central controller 101 allocates the time slot to the requesting communication unit from the first group 104–106 at step 304. Thus, the requesting communication unit is free to use the allocated time slot in accordance with the requested service.

At step 305, a second data channel update message is optionally transmitted following the expiration of the update interval sent in the first data channel update message. The second data channel update message may also contain an update interval, after which another data channel update message may be transmitted. This process of recurring data channel update messages may continue indefinitely. It is anticipated that a second data channel update message will not be transmitted in some cases. In these cases, the update interval of the first data channel update message might be a reserved code indicating that no second data channel update message has been scheduled for transmission.

If the condition of the communication system changes during the interval between the transmission of the first data channel update message at step 302 and the transmission of the second data channel update message at step 304, the allocation profile of the second data channel update message may be changed accordingly. For example, if another request from a communication unit in the first group were received, the allocation profile of the second data channel message may indicate a smaller number of time slots to be allocated to the data channel similar to the process already described. Alternately, if prior established communication services, such as telephone calls, have ended, the time slots allocated to these calls may be included in the new allocation profile of the data channel.

A special case occurs when the central controller 101 determines that the allocation profile of the data channel should be changed as described above, but a half-duplex communication unit of the second group 107–109 is transmitting when the second data channel update message is to be transmitted. Since a half-duplex communication unit that is transmitting would not be capable of receiving the second data channel update message, the allocation profile is not immediately changed. Instead, the second data channel update message is transmitted without a change in the allocation profile. The update interval included in the second data channel update message is set such that the allocation profile may be changed in a subsequent data channel update message after the transmission of the half-duplex communication unit is completed.

Figure 4:
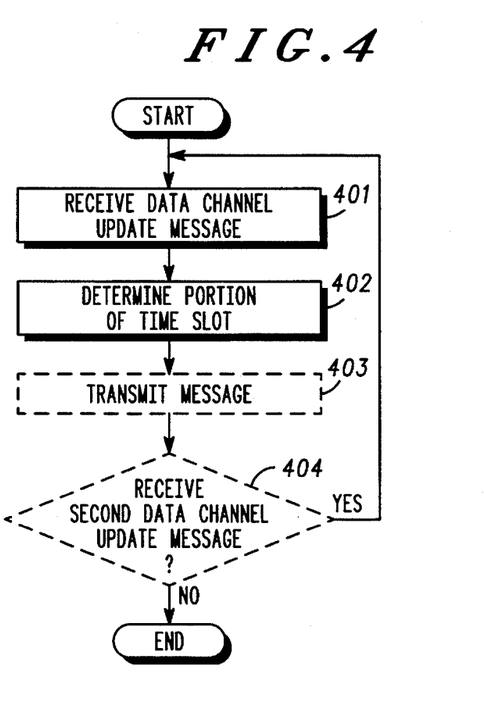
FIG. 4 is a flow chart for use in a communication unit of the second group of communication units.

FIG. 4 is a flow chart for use in a communication unit of the second group of communication units. The flow chart of FIG. 4 can be implemented as software stored in memory and executed by a microprocessor (not shown) within a communication unit of the second group 107–109. At step 401, a data channel update message is received via a time slot of the data channel. If a communication unit has just been turned on, or was unable to receive the data channel update message, for example due to channel errors, the communication unit must typically wait until receiving the next data channel update message before continuing to step 402.

As described above, the data channel update message includes an allocation profile which enables the communication unit to determine, at step 402, a portion of time slots now allocated to the data channel. The communication unit determines the time slots by examining the state of the bits in the allocation profile bitmap.

If necessary (i.e., if a data message is input at the communication unit data interface), the communication unit may transmit a message at step 403 using the data channel as defined by the allocation profile included in the data channel update message. At step 404, it is determined if a second data channel update message is to be received. The update interval included in the data channel update message received at step 401 can specify a period of time until the occurrence of the next data channel update message. When that period of time expires, a second data channel update message is received at step 401.

Alternately, if the channel update message received in step 401 indicates that a second data channel update message should not be expected, the process is discontinued. In order to detect a future data channel update message, the communication unit will have to monitor the time slots on the communication resource 110.

Figure 5:
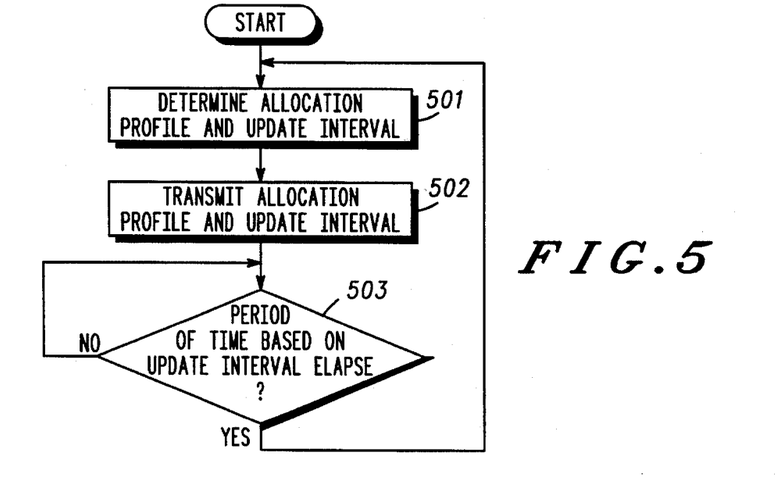
FIG. 5 is a flow chart of a second embodiment for use in a central controller.

FIG. 5 is a flow chart of a second embodiment for use in a central controller. As before, the flow chart of FIG. 5 can be implemented as software stored in memory and executed by a microprocessor (not shown) within the central controller 101. At step 501, the central controller determines the allocation profile and the update interval of the communication link. The allocation profile and the update interval may be based on one or more parameters, as described below.

Generally, the central controller 101 determines the allocation profile and the update interval based on the desire to maintain minimum levels of service quality for communication units in the first and second groups. Considering first the allocation profile, the allocation profile defines the time slots of the communication resource 110 that establish the data channel for the second group of communication units 107–109. Hence, it also implicitly defines the time slots that are either allocated or available to be allocated to communication units of the first group 104–106. If there are communication units in the first group whose requests are queued due to a lack of available time slots, the central controller 101 may choose to remove one or more time slots from the allocation profile defining the data channel so that they can be allocated to the queued requests of the first group 104–106. In essence, the central controller 101 is basing this decision at least in part on a desire to maintain the average access delay time for communication units in the first group 104–106 below an acceptable level. With more time slots allocated to the first group 104–106, it is easier for communication units in the first group 104–106 to establish communications, thereby reducing average access delay time.

In a similar vein, the central controller 101 may remove time slots from the allocation profile to create pad slots that will not be immediately allocated to communication units in the first group 104–106. When a request from a communication unit of the first group 104–106 is received, the pad slots can be used to immediately fulfill the requests. This causes a reduction in the average access delay for communication units in the first group 104–106 whose requests for time slots are received before the next data channel update message.

In determining the allocation profile, the central controller 101 can also consider the amount of data queued for transmission on the second group communication link. Thus, the central controller 101 determines the minimum number of time slots to be included in the allocation profile based on a system requirement to maintain a data delivery delay below a targeted performance level. In this manner, a data queue corresponding to the second group 107–109 can be maintained such that data is not lost.

Determination of the allocation profile can also consider the types and capabilities of communication units in the second group 107–109. For example, the communication units in the second group 107–109 may be capable of transmitting and/or receiving on a limited number of time slots per frame. This is often a result of processing limitations of the communication units. Hence, the central controller 101 can limit the allocation profile such that a maximum number of time slots that can be processed by the communication units in the second group 107–109 is not exceeded.

Turning to determination of the update interval, if all time slots not included in the allocation profile (i.e., as part of the data channel) are currently allocated to communication units in the first group 104–106, new service requests from communication units in the first group 104–106 may be delayed until the next data channel update message. Hence, the maximum update interval is preferably chosen to maintain the average access delay for communication units in the first group below a predetermined acceptable level. On the other hand, as the data channel update messages are transmitted via the data channel, the capacity of the data channel to communicate data messages is correspondingly reduced. Hence, the minimum update interval is preferably chosen to keep the utilization of the data channel for data channel update messages below a predetermined acceptable level. Stated another way, the frequency with which data channel updates are sent via the data channel varies such that average access delay for communication units in the first group 104–106 is minimized while data throughput for communication units in the second group 107–109 is maximized.

Between the minimum and maximum values thus determined, the central controller 101 may choose the update interval based on an amount of queued data for the second group 107–109. Thus, the central controller 101 determines an update interval, greater than the minimum but less than the maximum discussed above, such that a sufficient amount of the currently queued data can be transmitted before the next data channel update message. If the queued data may be transmitted in less than the minimum interval, the update interval is set at the predetermined minimum value. If the queued data would require an interval longer than the maximum interval, the update interval is set at the predetermined maximum value.

Finally, as described above, an exception condition may occur if a half-duplex communication unit of the second group has an ongoing inbound transmission simultaneous with the intended transmission of the data channel update message. In this case, the allocation profile would remain unchanged to enable the transmitting communication unit to complete its transmission successfully. The central controller 101 determines the update interval such that another data channel update message may be transmitted after the transmission of the communication unit is completed. Note that in the preferred embodiment of the communication system, communication units access the data channel to transmit data messages via a reservation protocol. Based on these reservations, the central controller 101 has sufficient information to predict when the ongoing inbound transmission will be completed, thereby implying a value for the update interval. In essence, the central controller 101 acts to temporarily extend the current allocation profile until such time as the half-duplex communication unit may receive a new allocation profile.

Having determined the allocation profile and update interval as described, the central controller 101 transmits the allocation profile and update interval at step 502, preferably as part of a data channel update message. At step 503, the central controller 101 waits for the period of time defined by the update interval (i.e., the amount of time required for a certain number of time slots) to elapse before beginning the process again at step 501. Although FIG. 5 shows that the next allocation profile and update interval are not determined until after the expiration of the current update interval, these may alternately be predetermined by the central controller during the current update interval. Using the procedure described above, data channel update messages are continuously transmitted as determined by the update intervals. This allows a communication system to respond to changing system requirements without over-utilization of system resources.

Figure 7:
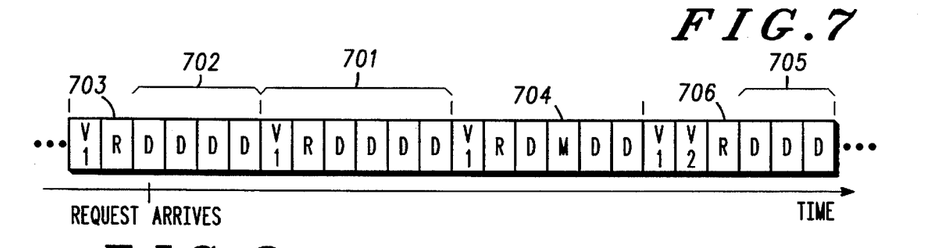
FIG. 7 is a time line illustrating usage of a data channel update message in accordance with a first embodiment.
Figure 8:
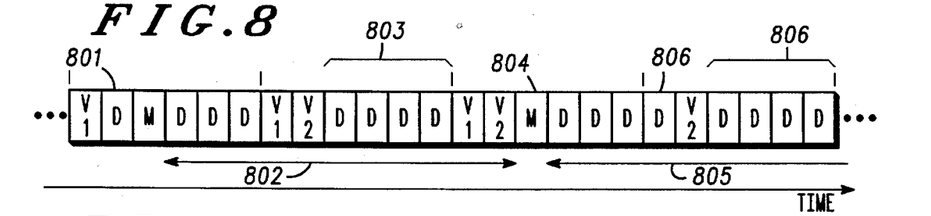
FIG. 8 is a time line illustrating usage of a data channel update message in accordance with a second embodiment.
Figure 9:
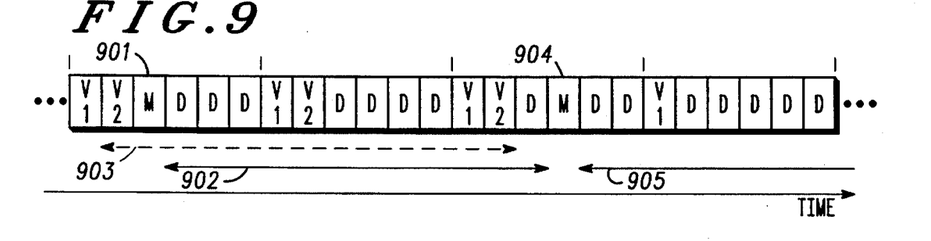
FIG. 9 is a time line illustrating usage of a data channel update message during an ongoing inbound transmission.

FIGS. 7–9 show examples of usage of the data channel update message. FIG. 7 is a time line illustrating usage of a data channel update message in accordance with a first embodiment. FIG. 7 shows a series of four frames 701 established by an outbound portion of the communication resource 110. As shown, each frame 701 comprises six time slots, although other numbers of time slots per frame are acceptable. A similar construction of frames comprising six time slots is also shown for FIGS. 8 and 9. In the initial frame shown in FIG. 7, a first time slot, labeled V1, is allocated to a communication unit in the first group 104–106 (e.g., a voice call) and a second time slot 703 is reserved as a pad slot. The remaining third through sixth time slots comprise a data channel 702.

During the first frame, a request for another voice call from a second communication unit of the first group 104–106 is received by the central controller 101, as shown. Responsive to this request a data channel update message 704 is transmitted by the central controller 101 during the third frame. This data channel update message 704 contains a new allocation profile indicating to the second group 107–109, in this example, that only the last three time slots of each subsequent frame now comprise the data channel 705. After transmitting the data channel update message 704, the central controller 101 allocates the second time slot, now labeled V2, to service the request received during the first frame. Note that the second time slot was a reserved slot 703 in previous frames. The central controller 101, as a result of reallocating the second time slot, designates, for example, the third time slot 706 as a reserved time slot.

In an alternate embodiment, the central controller 101 may choose to assign the reserved slot 703 to the request received in the first frame without waiting to reserve another time slot 706. In this case, the new voice call need not wait for the data channel update message to begin. Instead, the central controller 101 waits until after the data channel update message to reserve another time slot 706.

FIG. 8 is a time line illustrating usage of a data channel update message in accordance with a second embodiment. In the first frame, a first time slot, labeled V1, is allocated to a voice call in the first group 104–106. The remaining time slots comprise the data channel. A data channel update message 801 is transmitted via the data channel in the first frame. Prior to sending the data channel update message, the central controller 101 determined a new allocation profile and an update interval, the update interval resulting in a first period of time 802. As shown, it is assumed that the new allocation profile indicates that the third through sixth time slots comprise the data channel 803. Thus, for example, the second time slot removed from the allocation profile is allocated in the second and third frames to a second voice call, labeled V2.

After the expiration of the first period of time 802 based on the update interval sent in the first frame, a second data channel update message 804 is transmitted. This data channel update message results in a second period of time 805 based on the included update interval. Additionally, the allocation profile sent as part of the data channel update message 804 indicates that the first and third through sixth time slots now establish the data channel 806. In this example, the second voice call V2 is allowed to proceed per its original request. This cycle of new allocation profiles and update intervals continues as necessary. Note that FIG. 8 shows a relatively short update interval for the purposes of illustration. A typical update interval may be significantly longer.

FIG. 9 is a time line illustrating usage of a data channel update message during an ongoing inbound transmission. The central controller 101 transmits a data channel update message 901 during the first time frame shown. At that time, however, a half-duplex communication unit in the second group 107–109 is engaged in an ongoing inbound transmission which lasts a known period of time 903. As discussed above, the central controller 101 has knowledge of the duration of a call. Based on the ongoing inbound transmission, the central controller 101 does not change the allocation profile in the data channel update message 901, but indicates a first period of time 902 (based on the update interval) which does not expire until completion of the inbound transmission.

After expiration of the first period of time 902 in the third time frame, a second data channel update message 904 may be transmitted by the central controller. As shown, the second data channel update message 904 initiates a second period of time 905 (again, based on the update interval) and an expanded allocation profile is indicated, resulting in the data channel comprising the second through sixth time slots. In reflecting the current needs of the communication system 100, the second data channel update message 904 could have also included an allocation profile which further reduced the number of time slots used for the data channel.

Although FIGS. 7–9 show examples in which the data channel, defined by the allocation profile, is comprised of a series of contiguous time slots, it is understood that the allocation profile may indicate any arbitrary combination of time slots. This capability is realized via the variable-length bitmap representation of the allocation profile described above with reference to FIG. 6. FIGS. 7–9 also show examples of update intervals resulting in an integer multiple of frames. It is further understood that update intervals may be any number of time slots and are not limited to integer multiples of time frames. This allows for maximum flexibility in transmitting the data channel update messages via the data channel.

With the present invention, a method for controlling a data channel in a TDM wireless communication system is provided. Time slots established on a communication resource are dynamically allocated using data channel update messages as required, thereby providing acceptable service quality levels to the various services available on the communication system. Allocation of time slots to the various services is made in response to a variety of system parameters, including voice call access delay and data delivery delay. As the frequency of the data channel update messages adapts to changing traffic conditions, these update messages present minimal overhead on the data channel. Each data channel update message can contain an update interval, reducing communication unit complexity since signaling messages occur at predictable times.

We claim:

1. In a TDM wireless communication system comprising a plurality of communication units and a central controller that allocates a plurality of time slots among the plurality of communication units, wherein the plurality of communication units are logically divided into a first group and a second group, and wherein a data channel allocated to the second group comprises a portion of the plurality of time slots, a method for the central controller to dynamically control the portion of the plurality of time slots, the method comprising steps of:

a) receiving from a communication unit of the first group a request for at least one time slot of the plurality of time slots;

b) transmitting, via the data channel, responsive to the request, a data channel update message to the second group, wherein the data channel update message comprises an allocation profile that indicates the portion of the plurality of time slots; and c) allocating the at least one time slot to the communication unit of the first group once the data channel update message has been transmitted.

2. The method of claim 1, step (b) further comprising the step of transmitting the data channel update message, the data channel update message comprising an update interval.

3. The method of claim 2, step (b) further comprising the step of transmitting the data channel update message, wherein the update interval is based on an amount of queued data for the second group.

4. The method of claim 2, step (b) further comprising the step of transmitting the data channel update message, wherein the update interval is based on existence of an ongoing inbound transmission by a communication unit of the second group.

5. The method of claim 2, step (b) further comprising the step of transmitting the data channel update message, wherein the update interval is based on utilization of the data channel for the data channel update message.

6. The method of claim 2, step (b) further comprising the step of transmitting the data channel update message, wherein the update interval is based on an average access delay time for the first group.

7. The method of claim 2, further comprising a step of:

d) transmitting, via the data channel, a second data channel update message to the second group when a period of time based on the update interval has elapsed.

8. The method of claim 1, step (b) further comprising the step of transmitting the data channel update message, wherein the allocation profile comprises a bitmap uniquely corresponding to the plurality of time slots.

9. The method of claim 8, step (b) further comprising the step of transmitting the data channel update message, wherein the allocation profile is based on an average access delay time for the first group.

10. The method of claim 8, step (b) further comprising the step of transmitting the data channel update message, wherein the allocation profile is based on existence of at least one reserved time slot of the plurality of time slots.

11. The method of claim 8, step (b) further comprising the step of transmitting the data channel update message, wherein the allocation profile is based on an amount of queued data for the second group.

12. The method of claim 8, step (b) further comprising the step of transmitting the data channel update message, wherein the allocation profile indicates less than a maximum number of time slots.

13. The method of claim 8, step (b) further comprising the step of transmitting the data channel update message, wherein the allocation profile is unchanged during an ongoing inbound transmission by a communication unit of the second group.

14. In a TDM wireless communication system comprising a plurality of communication units and a central controller that allocates a plurality of time slots among the plurality of communication units, wherein the plurality of communication units are logically divided into a first group and a second group, and wherein a data channel allocated to the second group comprises a portion of the plurality of time slots, a method for a communication unit of the second group to transmit at least one message via the data channel, the method comprising the steps of:

a) receiving, via the data channel, a data channel update message comprising an allocation profile;

b) determining, based on the allocation profile, the portion of the plurality of time slots; and c) transmitting the at least one message via the data channel comprising the portion of the plurality of time slots.

15. The method of claim 14, step (a) further comprising the step of receiving the data channel update message, wherein the data channel update message comprises an update interval.

16. The method of claim 15, further comprising the step of:

d) receiving a second data channel update message when a period of time based on the update interval has elapsed.

17. The method of claim 16, step (d) further comprising the step of receiving the second data channel update message, wherein the update interval is based on existence of an ongoing inbound transmission by a communication unit of the second group.

18. The method of claim 14, step (b) further comprising the step of determining the portion of the plurality of time slots, wherein the allocation profile comprises a bitmap uniquely corresponding to the plurality of time slots.

19. In a TDM wireless communication system comprising a plurality of communication units and a central controller that allocates a plurality of time slots among the plurality of communication units, wherein the plurality of communication units are logically divided into a first group and a second group, and wherein a data channel allocated to the second group comprises a portion of the plurality of time slots, a method for the central controller to dynamically control the portion of the plurality of time slots, the method comprising the steps of:

a) determining an allocation profile and an update interval, wherein the allocation profile indicates the portion of the plurality of time slots;

b) transmitting, via the data channel, the allocation profile and the update interval to the second group;

c) repeatedly determining the allocation profile and the update interval; and d) repeatedly transmitting, via the data channel, the allocation profile and the update interval to the second group when a period of time based on the update interval has elapsed.

20. The method of claim 19, step (c) further comprising the step of repeatedly determining the update interval based on an amount of queued data for the second group.

21. The method of claim 19, step (c) further comprising the step of repeatedly determining the update interval based on existence of an ongoing inbound transmission by a communication unit of the second group.

22. The method of claim 19, step (c) further comprising the step of repeatedly determining the update interval based on utilization of the data channel for the transmission of the allocation profile and the update interval.

23. The method of claim 19, step (c) further comprising the step of repeatedly determining the update interval based on an average access delay time for the first group.

24. The method of claim 23, step (c) further comprising the step of repeatedly determining the allocation profile based on the average access delay time for the first group.

25. The method of claim 19, step (c) further comprising the step of repeatedly determining the allocation profile, wherein the allocation profile comprises a bitmap uniquely corresponding to the plurality of time slots.

26. The method of claim 25, step (c) further comprising the step of repeatedly determining the allocation profile based on existence of at least one reserved time slot of the plurality of time slots.

27. The method of claim 26, step (c) further comprising the step of repeatedly determining the allocation profile based on an amount of queued data for the second group.

28. The method of claim 25, step (c) further comprising the step of transmitting the data channel update message, wherein the allocation profile is unchanged during an ongoing inbound transmission by a communication unit of the second group.

29. The method of claim 25, step (b) further comprising the step of transmitting the data channel update message, wherein the allocation profile indicates less than a maximum number of time slots.

30. In a TDM wireless communication system comprising a plurality of communication units and a central controller that allocates a plurality of time slots among the plurality of communication units, wherein the plurality of communication units are logically divided into a first group and a second group, and wherein a data channel allocated to the second group comprises a portion of the plurality of time slots, a method for transmitting at least one message via the data channel, the method comprising the steps of:

at the central controller;

a) determining an allocation profile and an update interval, wherein the allocation profile indicates the portion of the plurality of time slots;

b) transmitting, via the data channel, a data channel update message comprising the allocation profile and the update interval to the second group;

at a communication unit of the second group;

c) receiving the data channel update message;

d) determining the portion of the plurality of time slots based on the allocation profile; and e) transmitting the at least one message via the data channel comprising the portion of the plurality of time slots.

31. The method of claim 30, further comprising the step of:

f) transmitting, by the central controller via the data channel, a second data channel update message when a period of time based on the update interval has elapsed.

32. The method of claim 31, step (f) further comprising the step of transmitting the second data channel update message, wherein the update interval is based on existence of an ongoing inbound transmission by a communication unit of the second group.

33. The method of claim 32, step (f) further comprising the step of transmitting the data channel update message, wherein the allocation profile is unchanged during the ongoing inbound transmission.

* * * * *